US010330791B2

(12) United States Patent
Revol

(10) Patent No.: US 10,330,791 B2
(45) Date of Patent: Jun. 25, 2019

(54) METHOD FOR LOCATING A JAMMING SOURCE JAMMING SIGNALS OF A SATELLITE NAVIGATION SYSTEM AND ASSOCIATED SYSTEM

(71) Applicant: THALES, Courbevoie (FR)

(72) Inventor: Marc Revol, Upie (FR)

(73) Assignee: Thales, Courbevoie (FR)

( * ) Notice: Subject to any disclaimer, the term of this patent is extended or adjusted under 35 U.S.C. 154(b) by 317 days.

(21) Appl. No.: 15/199,670

(22) Filed: Jun. 30, 2016

(65) Prior Publication Data

US 2017/0003394 A1 Jan. 5, 2017

(30) Foreign Application Priority Data

Jul. 3, 2015 (FR) ...................................... 15 01416

(51) Int. Cl.
*G01S 19/21* (2010.01)
*G01S 5/02* (2010.01)

(52) U.S. Cl.
CPC .............. *G01S 19/215* (2013.01); *G01S 5/02* (2013.01); *G01S 19/21* (2013.01)

(58) Field of Classification Search
CPC .................................................... G01S 19/215
See application file for complete search history.

(56) References Cited

FOREIGN PATENT DOCUMENTS

| DE | 19512787 | A1 | | 9/1996 | | |
|---|---|---|---|---|---|---|
| EP | 058847 | A1 | * | 2/1994 | ............... | F41G 7/00 |
| EP | 2410352 | A1 | | 1/2012 | | |
| WO | WO-03046606 | A1 | * | 6/2003 | ............... | G01S 3/14 |
| WO | WO-2009059929 | A1 | * | 5/2009 | ............... | G01S 3/14 |

OTHER PUBLICATIONS

Lin et al. "Robust Beamforming for GNSS Synthetic Antenna Arrays" ION GNSS 2009, Session A5, Savannah, GA, Sep. 22-25, 2009. pp. 1-15 (Year: 2009).*
Soloview et al. "Synthetic Aperture GPS Signal Processing: Concept and Feasibility Demonstration" Inside GNSS, May/Jun. 2009. pp. 37-46b. (Year: 2009).*
French Search Report and Written Opinion dated Apr. 27, 2016, in French Patent Application No. 1501416, filed Jul. 3, 2015, 9 pages.
Broumandant, A., et al., "Direction of Arrival Estimation of GNSS Signals Based on Synthetic Antenna Array," Proceedings of the 20th International Technical Meeting of the Satellite Division, Sep. 25-28, 2007, pp. 728-738.

* cited by examiner

*Primary Examiner* — Gregory C. Issing
(74) *Attorney, Agent, or Firm* — Davis Wright Tremaine LLP; Michael J. Donohue

(57) ABSTRACT

Jammer location is based on detected powers received by at least one receiver of signals from the satellite navigation system on board a carrier, by estimation, for each satellite, of the power of the noise at the output of each receiver according to the bearing and distance with respect to the carrier, a calculation of the sum of estimated powers, and extraction of the local maxima in terms of bearing and distance by using a synthetic aperture antenna carrying out a coherent integration of received signals in the direction of each bearing angle by using the known movement of the carrier, in which estimation of the power of the noise at the output of each receiver uses a plurality of coherent integrators and non-coherent integrators, with durations matched to the transit time of a source in the beam of the antenna for various distances for the non-coherent integrators.

8 Claims, 2 Drawing Sheets

METHOD FOR LOCATING A JAMMING SOURCE JAMMING SIGNALS OF A SATELLITE NAVIGATION SYSTEM AND ASSOCIATED SYSTEM

CROSS REFERENCE OF THE RELATED APPLICATIONS

This application claims priority to French Application No. 1501416, filed Jul. 3, 2015, the disclosure of which is incorporated by reference herein in its entirety.

BACKGROUND OF THE INVENTION

Field of the Invention

The invention relates to a method for locating a jamming source jamming signals of a satellite navigation system and an associated system.

Description of Related Art

The term "jamming source" is understood to mean a source of intentional jamming or a source of interference.

A satellite navigation system, or GNSS for global navigation satellite system, uses a constellation of satellites moving around the earth in very precisely determined orbits. Thus, it is possible to know, at any instant, the position of any satellite. The orbits of satellites are chosen so that at any time, six to 12 satellites are visible from any point on the earth. Each satellite transmits multiple radio signals of determined modulation and frequency. On the ground or on a land, sea or air vehicle, a receiver receives the signals transmitted by visible satellites.

An on-board satellite navigation system receiver measures the duration of propagation required for a timestamp transmitted by a satellite to reach it. The timestamps are encoded in carrier waves via the phase modulation technique. Each satellite thus transmits a set of pseudo-random codes that are specific thereto. A replica of the code sequence is generated by the receiver and the shift that the replica must undergo in order to coincide with the received code corresponds to the propagation time required by the signal to travel the satellite—receiver distance. This time multiplied by the speed of light in the traversed medium gives a distance measurement referred to as the pseudo-distance. Based on measurements of the pseudo-distances separating it from each visible satellite, and on knowledge of the position of the satellites, the receiver deduces its precise position in terms of latitude, longitude and altitude in a terrestrial frame of reference through numerical resolution akin to triangulation. Based on phase (Doppler) measurements of the carriers, and on precise knowledge of the apparent speed of the satellites, the receiver precisely calculates the speed. It may also deduce therefrom the precise date and time in the temporal frame of reference of the satellite navigation system.

The reception of the satellite signals and the precision of the measurements remains very sensitive, despite broadening spreading codes and increasing transmission powers, to the presence of jamming and interference sources.

The services making fundamental use of GNSS location and time transfer systems are many and play an important role in the economy and functioning of state infrastructure.

As such, protecting GNSS services from jamming sources is one of the imperatives of states, which must deploy detection and location means over the entire territory so as to ensure that the signal reception environment is in accordance with usage standards.

The proposed invention falls within the scope of a extended system for monitoring the quality of the signal reception environment, including all GNSS constellations, which system is dedicated to the detection and location of sources of interference or jamming liable to degrade the quality of position, speed and time measurements delivered by GNSS systems.

The invention relates in particular to the capability of using rail, air and maritime—and even road—transport platforms to relax the grid of a fixed surveillance network, and concentrate the surveillance around transport routes of goods and persons.

Faced with the first demonstrations of the vulnerabilities of receivers and the presence of low-cost personal jammers, conventional means for analysing the spectrum of GNSS signals are gradually being deployed in proximity to critical infrastructure such as airports, ports, communication centres, nuclear power plants, etc.

However, such means (covering the national territory with a network of spectral analysis stations allowing strong jammers to be detected) are relatively ineffective in the case of distant wideband jammers, as the level of jamming sufficient to interfere with GNSS signals is much lower than the standard level of thermal noise.

This makes it very difficult to detect weak jamming sources, which are nonetheless capable of interfering with the operation of receivers, and to predict their impacts on the operation of user receivers located in the vicinity of the analyser antenna.

Such solutions require a large number of stations in order to cover the territory, hence a high cost. Furthermore, the detection area is limited to around each station. The location of a strong jamming source is done by crossing the levels measured over multiple stations.

SUMMARY OF THE INVENTION

One aim of the invention is to detect and locate GNSS jamming sources over large areas, for example around communication channels, from mobile receivers.

Additionally proposed, according to one aspect of the invention, is a method for locating a jamming source jamming signals of a satellite navigation system based on detected powers received by at least one receiver of signals from the satellite navigation system on board a carrier, comprising an estimation, for each satellite of the navigation system, of the power of the noise at the output of each receiver according to the bearing angle with respect to the carrier and the distance with respect to the carrier, a calculation of the sum of said estimated powers, and an extraction of the local maxima in terms of bearing and distance by using a synthetic aperture antenna carrying out a coherent integration of said received signals in the direction of each aiming bearing angle by using the known movement of the carrier, in which said estimation of the power of the noise at the output of each receiver uses a plurality of coherent integrators and a plurality of non-coherent integrators, with durations matched to the transit time of a source in the beam of the antenna for various distances for the plurality of non-coherent integrators.

Such a method allows a map of the jamming sources in proximity to communication channels that are liable to interfere with mobile navigation to be obtained, by taking advantage of the movement of the receiver in order to spatially locate these sources.

Thus, it is possible to carry out trajectography of the sources without having to deploy an antenna that uses complex spatial processing, on the basis of a standard GNSS receiving antenna.

In one mode of implementation, said estimation comprises a correction of the carrier phase of said signal corresponding to the movement of the carrier projected orthogonally in the direction of each aiming bearing angle, in acquisition phase or in tracking phase.

Thus, the movement of the carrier is employed in order to track, in terms of angle and distance, targets by exploiting their running speed.

According to another mode of implementation, said correction comprises a determination of a movement speed vector of the carrier.

Thus, knowledge of the movement speed of the carrier allows both a synthetic antenna to be reconstructed in order to simultaneously aim in different directions, allowing the space surrounding the moving carrier to be monitored and to carry out trajectography of the targets once detected.

In one mode of implementation, said determination of a movement speed vector of the carrier comprises a temporal synchronization in order to measure the reference trajectory of the carrier and apply movement corrections required for implementing a synthetic antenna, at the instants of reception of the signals from the satellite navigation system.

Thus, the signals are maintained with stationary phase for a duration compatible with the apparent length of the synthetic antenna and each of its aiming directions.

According to one mode of implementation, said determination of a movement speed vector of the carrier uses data provided by a receiver of signals from a satellite navigation system and/or data provided by an inertial unit.

Thus, the system for locating jamming sources is standalone and may easily be adapted to various types of carriers.

Also proposed, according to one aspect of the invention, is a system for locating a jamming source jamming signals of a satellite navigation system based on detected powers received by at least one receiver of signals from the satellite navigation system on board a carrier, comprising a computer configured to carry out an estimation, for each satellite of the navigation system, of the power of the noise at the output of each receiver according to the bearing angle with respect to the carrier and the distance with respect to the carrier, a calculation of the sum of said estimated powers, and an extraction of the local maxima in terms of bearing and distance by using a synthetic aperture antenna carrying out a coherent integration of said received signals in the direction of each (aiming) bearing angle by using the known movement of the carrier. Said estimation of the power of the noise at the output of each receiver uses a plurality of coherent integrators and a plurality of non-coherent integrators, with durations matched to the transit time of a source in the beam of the antenna for various distances for the plurality of non-coherent integrators.

According to one mode of implementation, the system for locating jamming sources comprises means for tracking the paths along the bearing angles and trajectography via azimetry of these paths.

The term "azimetry" is understood to mean the method, mainly applied in the fields of radar and sonar, that allows, by virtue of the evolution of azimuth measurements and the knowledge of the trajectory of the receiving antenna at the same instants, to go back to the location of the source of the signal, under certain assumptions of simple movements (fixed, uniform rectilinear movement).

The invention will be better understood on studying a few embodiments described by way of wholly non-limiting examples and illustrated by the appended drawings in which:

DETAILED DESCRIPTION OF THE INVENTION

In both figures, elements with identical references are similar.

Figure 1:
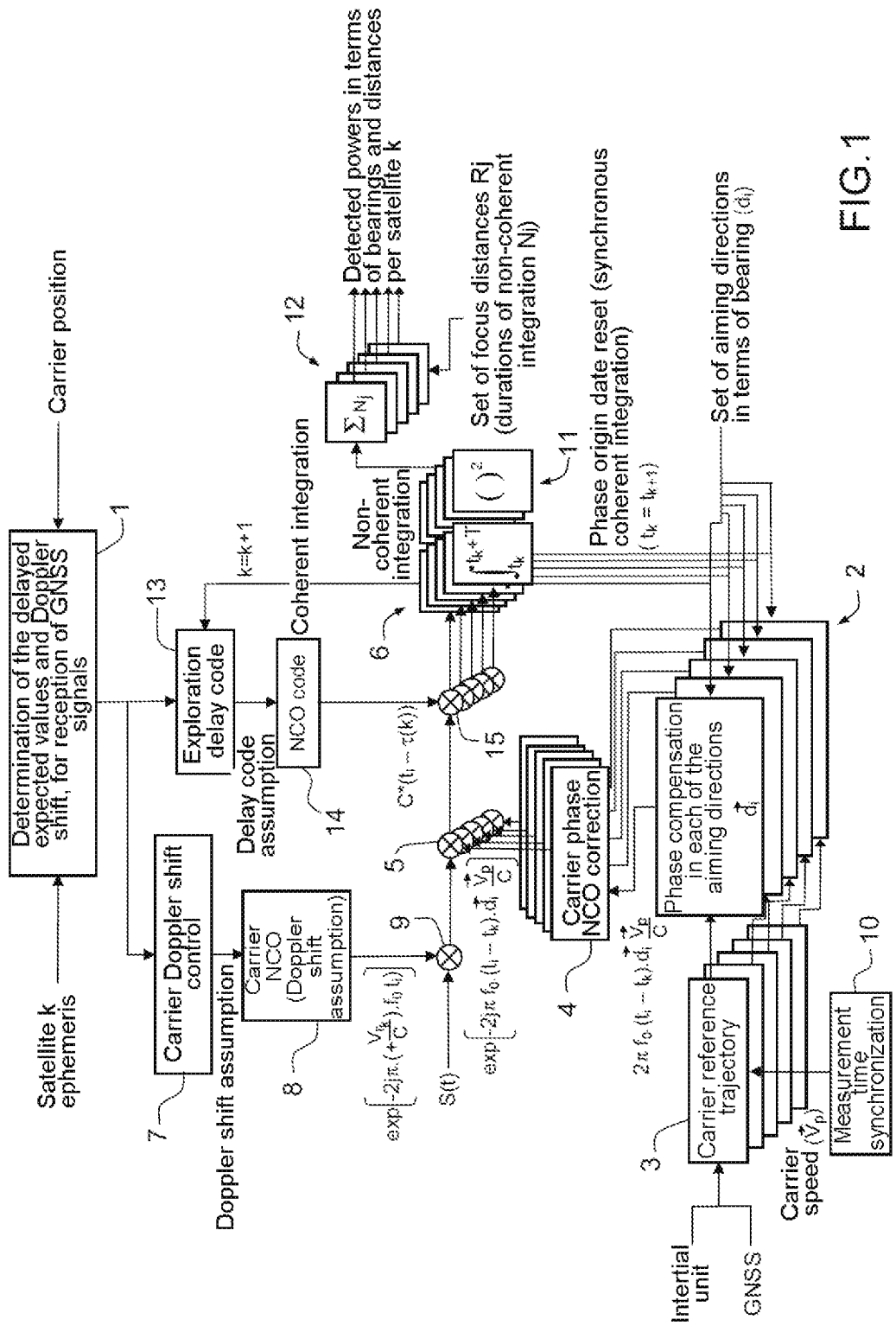
FIG. 1 diagrammatically illustrates one embodiment of a system according to one aspect of the invention.

FIG. 1 diagrammatically shows one implementation of the present invention.

Spatial processing for forming directional channels is based on that of synthetic receiving antennas, as described in the French patent FR2962812 B1.

Synthetic antenna processing allows coherent integrations of the received signals to be carried out, spatially, by exploiting the movement of the carrier, which is assumed to be known. The basic principle consists of compensating for the movement of the carrier projected onto the expected directions of the signal, which is assumed to be stationary, in order to maintain a stationary phase for the duration of integration.

It is therefore possible to define the aiming angles of the antenna that correspond to the directions in which signal detection is desired to be carried out.

The function of the spatial processing is to achieve complete coverage of the bearing angles (360°) with respect to the axis of movement of the carrier, by virtue of directional beams of the synthetic antenna that overlap one other at −3 dB.

These beams are produced continuously and in parallel.

As the GNSS receiver is tuned to the frequencies of the satellite signals, only the sources of interference that are liable to be received in the vicinity of these reception frequencies are of interest.

However, as the relative Doppler shifts depend on the satellites, the spatial processing is carried out so as to be adapted to each tracked satellite. According to the computing capabilities of the GNSS receiver, it is possible to envisage accumulating the spatial processing detection outputs together over all or only some of the tracked satellites.

The estimation of the distance of the jamming source is carried out by adapting the duration of non-coherent integration of the detection chain in each of the aiming channels of the synthetic antenna, in terms of bearing, according to the running speed of the target in the channel, for various distance assumptions.

The duration of integration is determined by the speed of the carrier, the width and bearing direction of the channel and, of course, assumptions of the distance of the jamming source. A battery of non-coherent integrators, specific to the bearing direction of the channel, is therefore associated with each channel.

The non-coherent integration (which allows the distance adaptation) is itself preceded by a coherent integration step, for a constant elementary duration and identical for all channels, which allows the apparent spread (size) of the antenna to be reconstructed for the duration of the coherent integration.

This coherent integration processing thus allows an estimation of the power field of the signal in terms of bearing to be provided, which estimation is updated on each coherent integration period. The non-coherent integration allows the power field to be accumulated over durations corresponding to the transit time of the target under various angle and distance assumptions, for the current speed of the carrier, this being under the assumption that the trajectory remains rectilinear for the duration of non-coherent integration, or even under the condition of carrying out the non-coherent accumulation of powers in directions that are stable in terms of azimuth (hence after compensating for the variation in the direction of movement of the carrier).

FIG. 1 shows the principle of applying synthetic aperture antennas to the detection and location of sources of jamming and/or interference.

The coherent integration is carried out while taking the movement of the carrier into account.

A determination 1 of the delayed expected values and Doppler shift for the reception of GNSS signals is carried out. This determination of the tracking parameters in terms of frequency and distance carries out the maintenance of the carrier Doppler value corresponding to the speed of the satellite, calculated from the position of the carrier at the current time, associated with a physical "top" ("1PPS" at input). This maintenance is carried out for each of the satellites of the GNSS system, based on knowledge of the ephemerides that allows their precise positions at each instant (provided by reference 1PPS) to be calculated, along with positions and speeds of the carrier which may be provided by any reference providing a dated position (e.g. GPS receiver, whether or not combined with an inertia). As this calculation is specific to each satellite, there are as many calculations as there are satellites.

A calculation 2 for correcting the additional carrier phase allows the phase evolution linked to the movement of the carrier in the direction of the aiming channel to be compensated for; this correction is added to the conventional correction of the Doppler shift of the satellite in order to reconstruct the direction of the directional channels (upper left portion of the diagram: carrier NCO).

This phase evolution corresponds to the projection of the movement of the carrier (defined by a calculated speed 3 of the carrier) onto the aiming direction of the antenna (there are as many phase corrections as there are aiming directions, for each of the tracked satellites).

This phase correction 2 is calculated according to the following expression:

$$2\pi \cdot f_0 \cdot (t_i - t_k) \cdot \vec{d}_i \cdot \frac{\vec{V}_p}{C}$$

in which:

f0 is the frequency of the Doppler channel in question (this is done in an identical manner across the set of K Doppler channels), in Hz;

tk is the instant of starting coherent integration 4 which provides the phase origin date, in s, ti is the current instant, in s, $\vec{d}_i$ is the unit vector of the direction of the satellite as seen from the carrier (unit vector), in Cartesian coordinates;

$\vec{V}_p$ is the speed vector of the carrier, in m/s; and

C is the speed of light, in m/s.

This phase is subsequently introduced and corrected 4 by a carrier-phase numerically controlled oscillator NCO that allows a correction signal to be generated and maintained.

For each satellite taken into account, there are as many carrier-phase numerically controlled oscillators 4 as there are channel directions in terms of bearing.

The carrier phase of a satellite is thus corrected from the phase corresponding to the aiming direction by numerically controlled oscillators 4 and multipliers 5.

This phase correction corresponds to the projection of the movement speed of the carrier in the direction of the received signal, this being for a duration T of coherent integration 6 relative to a particular position of the delay of the local signal being tested 13. The implementation of a correlation between the interference (jammer) signal and the synchronized local code in each of the received satellite signals makes it possible to carry out a precise estimation of the effect of the interfering signal on the reception chain of the GNSS receiver, whose sensitivity to jamming sources depends both on the spectrum of the jamming signal and on the spectral spread of this signal after the spectral convolution carried out by correlation with the local codes. The application of phase compensations in each aiming direction is synchronized with the application of the coherent integration 6.

The duration T of the coherent integration is determined by the number of bearing channels that are to be formed. For example, the generation of 16 bearing channels requires a duration of coherent integration of 20 ms for a vehicle moving at 35 m/s, i.e. 126 km/h.

The synchronization of the local code (for each of the channel directions) is carried out by controlling the delay of code 13 to be applied to the generation 14 of a signal of the GNSS local code (BPSK type modulation) by a numerically controlled oscillator NCO code 14, and calculated from step 1 of determining the delayed expected values and Doppler shift of the GNSS signals. This estimation is carried out independently of that of the GNSS receiver, which could have been affected by the jamming source.

The generation 14 of the local code with the expected delay is carried out by a numerically controlled code generator. The received signal is multiplied, by a multiplier 15, by the signal generated 14 by the numerically controlled code generator.

The non-coherent integration 12 is carried out on each bearing channel, after coherent integration and quadratic detection 11. The received power may then be estimated by summation of the bearing channel outputs, under the assumption of rectilinear movement for the duration of non-coherent integration 12.

In order to be more robust to changes in the trajectory of the carrier, in one variant of the non-coherent integration 12 it is possible to carry out an interpolation of the power at the output of the bearing channels, so as to reconstruct a distribution of the received power that is stable in terms of azimuth, this being achieved by using the movement heading that is available on each coherent integration period. This requires a prior transformation of the measurement scale in terms of bearing (obtained after coherent integration and quadration 6 and 11) to a measurement scale in terms of azimuth, this being achieved using the known heading of the carrier.

This detection is carried out in parallel in all of the channel directions. This parallel tracking of channels, whose directionality overlaps at −3 dB of the main lobe, allows an angular interpolation for a precise location of the angle of incidence of the signal to be carried out by searching for the local maxima along the bearing or azimuth directions.

After the determination 1 of the values expected to be delayed and Doppler shift for the acquisition of GNSS signals, a Doppler shift control 7 allows the value of the reference carrier frequency to be controlled according to the expected value of the Doppler shift of the signal received from each satellite.

The generation 8 of a signal at the expected frequency of the Doppler channel is carried out by a carrier numerically controlled oscillator. The received signal S(t) is multiplied, by a multiplier 9, by the signal generated 8 by the carrier numerically controlled oscillator.

A synchronization 10 of measurement times allows the estimation 3 of the reference trajectory of the carrier to be synchronized with the time base of the receiver via the provision of a shared clock. The synchronization output signal 10 allows the trajectory reference 3 of the carrier, i.e. the position, speed and direction of movement of the carrier, to be determined.

At the output of the non-coherent integration 12, the power of the signal received in each of the bearing channel directions and for various assumptions of the progression of the target in the channel, adapted to the various durations of non-coherent integration, is available.

Figure 2:
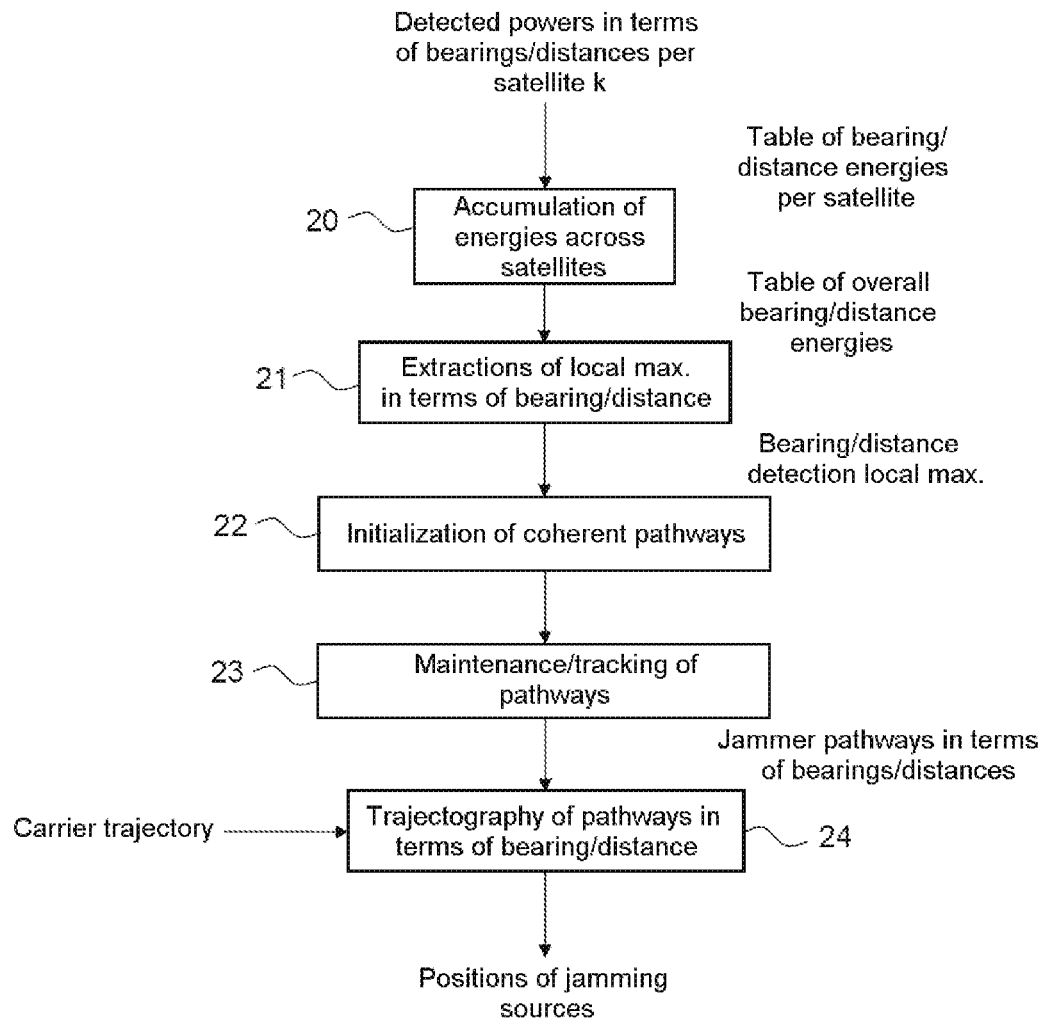
FIG. 2 diagrammatically illustrates the operation of the system according to one aspect of the invention.

FIG. 2 diagrammatically shows the method for locating jamming sources using the angle-distance outputs of the processing of FIG. 1.

Based on the detected powers in terms of bearing and distance per satellite k of the GNSS system, FIG. 2 illustrates how the presence of a jammer and its presence are determined.

FIG. 1 illustrates the principle of calculating the received power or energy according to the bearing or distance of the durations of non-coherent integration Nj which provide a grid of received energies Ek(di, Nj) per satellite k, the code generated for the correlation being specific to each satellite.

FIG. 2 shows, as input, the detected powers in terms of bearing and distance per satellite k, corresponding to the output of FIG. 1.

An accumulation 20 of the energies $E_k(d_i, N_j)$ across all of the satellites k, by using a table of bearing and distance energies per satellite k.

Next, the local maxima in terms of bearing and distance are extracted 21 by using a table of overall bearing and distance energies.

Next, an initialization 22 of tracking pathways, corresponding to the local maxima arising from one and the same jamming source identified by continuous and directionally coherent detection across multiple successive recurrences, is carried out; a pathway initialization principle consists of identifying the existence of N detections of local maxima in the same bearing direction (for example, across three successive recurrences in an interval depending on the signal-to-noise ratio of the local maximum).

Then the pathways are maintained and tracked 23; once the pathway has been initialized, the proximity of the new local maxima (successive recurrences) to each of the existing pathways is evaluated and the new event is associated, or not, with each recurrence t, according to a distance criterion depending on the age (from the moment of initialization of the pathway) of the pathway and on the signal-to-noise ratio of the tested local maximum. The retained maxima are then integrated in a recursive filter of alpha-beta type, which allows the bearing measurement noise associated with the pathway to be filtered out and the bearing position for the subsequent recurrence (t+1) to be predicted in order to refresh the association test for future events. The bearing pathways are subsequently converted to azimuth pathways so as to be able to visualize the evolution of their progression independently of variations in the trajectory of the carrier.

Lastly, the position of the one or more transmitters is determined 24 from the sequence of filtered measurements, each forming pathways 23; to do this, it is assumed that the source is fixed and that the trajectory of the carrier is known over the duration of observation of the pathways. Multiple angle-distance azimetry methods, of the type of those applied to radar or sonar, may be used for this purpose.

The steps of the method described above may be carried out by one or more programmable processors executing a computer program in order to carry out the functions of the invention by processing input data and generating output data.

A computer program may be written in any form of programming language, including compiled or interpreted languages, and the computer program may be deployed in any form, including as a standalone program or as a subprogram, element or other unit suitable for use in a computer environment. A computer program may be deployed so as to be executed on a computer or on multiple computers on one site or distributed across multiple sites and connected to one another by a communication network.

The preferred embodiment of the present invention has been described. Various modifications may be made thereto without departing from the scope of the invention. Consequently, other implementations are within the scope of the following claims.

The invention claimed is:

1. A method for locating a source of jamming signals of a global navigation satellite system (GNSS) based on a distribution of a received signal power according to an arrival angle and distance range, using a synthetic aperture antenna, for detected powers received by at least one receiver of signals from the satellite navigation system on board a receiver platform having a known trajectory, comprising:
   estimating, for each satellite (k) of the navigation system, a power of noise at an output of each receiver based on a bearing angle with respect to the receiver platform and a distance with respect to the receiver platform;
   calculating a sum of said estimated powers
   extracting a local maxima in terms of bearing and distance by using the synthetic aperture antenna carrying out a coherent integration of said received signals in a direction of each bearing angle by using a known trajectory of the receiver platform, in which said estimation of the power of the noise at the output of each receiver uses a plurality of coherent integrators and a plurality of non-coherent integrators, with durations matched to a transit time of a source in a beam of the synthetic aperture antenna for various distances for the plurality of non-coherent integrators; and
   using the estimated power at the output of each receiver to determine trajectography of pathways in terms of bearing and distance to thereby determine the source of the jamming signals.

2. The method of claim 1, in which said estimating comprises correcting a carrier phase of said signal corresponding to the movement of the receiver platform projected orthogonally in a direction of each bearing angle, in acquisition of the satellite signals or in tracking of the satellite signals.

3. The method of claim 2, in which said correcting comprises determining a movement speed vector of the receiver platform.

4. The method of claim 3, in which said determining a movement speed vector of the receiver platform uses data provided by the receiver of signals from the satellite navigation system and/or data provided by an inertial unit.

5. The method of claim 3, in which said determining a movement speed vector of the receiver platform comprises a temporal synchronization to thereby measure the reference trajectory of the receiver platform and apply movement corrections required for implementing a synthetic antenna, at the instants of reception of the signals from the satellite navigation system.

6. The method of claim 5, in which said determining a movement speed vector of the receiver platform uses data provided by a receiver of signals from a satellite navigation system and/or data provided by an inertial unit.

7. A system for locating a jamming source jamming signals of a satellite navigation system based on detected powers received by at least one receiver of signals from the satellite navigation system on board a receiver platform, comprising a computer configured to carry out:
   an estimation, for each satellite (k) of the navigation system, of the power of the noise at the output of each receiver according to the bearing angle with respect to the receiver platform and the distance with respect to the receiver platform,
   a calculation of the sum of said estimated powers,
   an extraction of a local maxima in terms of bearing and distance by using a synthetic aperture antenna carrying out a coherent integration of said received signals in the direction of each bearing angle by using the known movement of the receiver platform, said estimation of the power of the noise at the output of each receiver using a plurality of coherent integrators and a plurality of non-coherent integrators, with durations matched to the transit time of a source in the beam of the antenna for various distances for the plurality of non-coherent integrators and
   use the estimated power at the output of each receiver to determine trajectography of pathways in terms of bearing and distance to thereby determine the source of the jamming signals.

8. The system of claim 7 wherein the computer is further configured to track the pathways along the bearing angles and trajectography via azimetry of these paths.

* * * * *